Patented June 5, 1951

2,555,736

UNITED STATES PATENT OFFICE 2,555,736

2-HYDROXY, 4-AMINO ISOPHTHALIC ACID AND A PROCESS FOR THE PRODUCTION THEREOF

Ernst Felder, Schaffhausen, Switzerland, assignor to Cilag Limited, Schaffhausen, Switzerland, a Swiss company No Drawing. Application March 3, 1950, Serial No. 147,577. In Switzerland March 24, 1949

7 Claims. (Cl. 260—519)

1

The invention relates to a new dicarboxylic acid and a process for the production thereof.

The present invention provides a new chemical compound, 4-amino-2-hydroxy-benzene- 1.5 - dicarboxylic acid which has been found, amongst other therapeutically valuable properties, to have a good activity against acid-resistant bacteria, especially against tubercle bacilli, and which may be used as a medicine and as an intermediate product. The invention also provides a process for the production of this new compound, wherein a compound of the general formula:

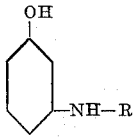

in which R represents a hydrogen atom or a radical readily split off by hydrolysis, for example an acyl or a carbalkoxy radical, and in which the hydrogen atom in the p-position to the hydroxy or R—NH— group may be substituted by the carboxyl group, or a salt of the said compound, is treated in the heat with carbon dioxide and a carbonate, for example an alkali or alkaline earth bicarbonate, so as to form 4-amino-2-hydroxy-benzene-1.5-dicarboxylic acid. The new compound can also be obtained by introducing formyl groups into the starting materials and oxidising the formyl groups to carboxyl groups.

The following examples show how the process of the invention may be carried into effect.

Example 1

100 gms. m-amino-phenol, 350 gms. of water and 400 gms. of potassium bicarbonate are heated in an autoclave at 120° C. for 24 hours under a carbon dioxide pressure of 15 atmospheres. The mixture of m-amino-phenol and potassium bicarbonate precipitated on cooling the reaction mixture is separated, the solution is adjusted to a pH of 1 with nitric acid, the 4-amino-2-hydroxy-benzene-1.5-dicarboxylic acid which is thus precipitated is sucked off, washed well with water, and re-precipitated from soda solution with 2 N hydrochloric acid. The 4-amino-2-hydroxy-benzene-1.5-dicarboxylic acid which is thus obtained in good yield is a colourless powder, melting at 210–211° C. with decomposition. It is readily soluble in dilute alkalies, moderately soluble in methanol, ethanol and acetone, practically insoluble in dilute mineral acids and in hydrocarbons.

By neutralising the nitric acid solution, a small quantity of the simultaneously produced 4-amino-2-hydroxy-benzoic acid can be obtained as a by-product in a good state of purity. The new compound may also be prepared without the use of pressure by passing $CO_2$ for a long time into a boiling, preferably aqueous solution of m-aminophenol and potassium bicarbonate.

Example 2

145 gms. of 4-amino-2-hydroxy-benzoic acid, 600 gms. of potassium bicarbonate and 500 grams of water are heated in an autoclave at 130° C. for 12 hours under a carbon dioxide pressure of 15 atmospheres. After completion of the reaction the mixture is worked up as indicated in Example 1, whereby 4-amino-2-hydroxy-benzene-1.5-dicarboxylic acid is obtained in excellent yield.

Example 3

150 gms. of 4-hydroxy-anthranilic acid, 600 gms. of water and 600 gms. of potassium bicarbonate are heated in an autoclave at 120–130° C. for 12 hours under a $CO_2$ pressure of 15 atmospheres. After completion of the reaction, potassium bicarbonate is separated as described in Example 1, the solution is acidified with hydrochloric acid, 4-amino-2-hydroxy-benzene-1.5-dicarboxylic acid is collected and re-precipitated to purify it.

The new acid may also be isolated in the form of its salts, for example with sodium, calcium or organic bases.

What I claim is:

1. The new chemical compound, 4-amino-2-hydroxy-benzene-1.5-dicarboxylic acid.

2. The process for the production of 4-amino-2-hydroxy-benzene-1.5-dicarboxylic acid which comprises heating 4-amino-2-hydroxy-benzoic acid and potassium carbonate in aqueous solution with carbon dioxide under pressure, and precipitating 4-amino-2-hydroxy-benzene - 1.5 - dicarboxylic acid from the reaction mixture with nitric acid.

3. The process for the production of 4-amino-2-hydroxy-benzene - 1.5 - dicarboxylic acid which comprises heating 4-hydroxy-anthranilic acid and potassium carbonate in aqueous solution with carbon dioxide under pressure, and precipitating 4-amino-2 - hydroxy - benzene - 1.5 - dicarboxylic acid from the reaction mixture.

4. Process for preparing 4-amino-2-hydroxy-benzene-1.5-dicarboxylic acid, comprising reacting carbon dioxide and a bicarbonate with a compound of the general formula:

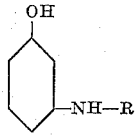

wherein R represents a member selected from the group consisting of hydrogen and radicals which are readily split off by hydrolysis, said compound containing an organic group selected from the group consisting of a carboxyl group in p- position to the OH group, a carboxyl group in p-position to the —NH—R group, and one of said carboxyl groups having the acid hydrogen replaced by a metal.

5. The process according to claim 4, wherein said reaction is carried out in an aqueous medium.

6. The process according to claim 4, wherein potassium bicarbonate is used as said bicarbonate.

7. The process according to claim 4, wherein said reaction is carried out under pressure.

ERNST FELDER.

REFERENCES CITED

The following references are of record in the file of this patent:

UNITED STATES PATENTS

| Number | Name | Date |
| --- | --- | --- |
| 2,540,104 | Doub | Feb. 6, 1951 |

FOREIGN PATENTS

| Number | Country | Date |
| --- | --- | --- |
| 12,191 | Great Britain | of 1889 |

OTHER REFERENCES

Benica et al., Chem. Abstracts, vol. 39, p. 1633 (1945).